US012800192B2

(12) United States Patent
Lu et al.

(10) Patent No.: US 12,800,192 B2
(45) Date of Patent: Nov. 17, 2026

(54) HEAT COLLECTION AND RELEASE SYSTEM AND METHOD FOR SOLAR GREENHOUSE

(71) Applicant: SICHUAN AGRICULTURAL UNIVERSITY, Chengdu (CN)

(72) Inventors: Wei Lu, Chengdu (CN); Yangxia Zheng, Chengdu (CN); In-Bok Lee, Seoul (KR); Qichang Yang, Chengdu (CN); Yue Liu, Chengdu (CN); Junwei Yin, Chengdu (CN); Yifei Su, Chengdu (CN); Yuexuan He, Chengdu (CN); Linjiang Zhou, Sichuan (CN); Zhenhong Ye, Chengdu (CN); Jiayi Yan, Chengdu (CN)

(73) Assignee: SICHUAN AGRICULTURAL UNIVERSITY, Chengdu (CN)

(*) Notice: Subject to any disclaimer, the term of this patent is extended or adjusted under 35 U.S.C. 154(b) by 734 days.

(21) Appl. No.: 18/261,326

(22) PCT Filed: Jun. 12, 2023

(86) PCT No.: PCT/CN2023/099639
§ 371 (c)(1),
(2) Date: Jul. 13, 2023

(87) PCT Pub. No.: WO2024/250310
PCT Pub. Date: Dec. 12, 2024

(65) Prior Publication Data
US 2026/0185746 A1 Jul. 2, 2026

(30) Foreign Application Priority Data
Jun. 5, 2023 (CN) ......................... 202310653164.3

(51) Int. Cl.
*F24S 70/16* (2018.01)
*F24S 10/30* (2018.01)
(Continued)

(52) U.S. Cl.
CPC ............... *F24S 70/16* (2018.05); *F24S 10/30* (2018.05); *F24S 50/80* (2018.05); *F24S 70/14* (2018.05); *F24S 70/20* (2018.05)

(58) Field of Classification Search
CPC .. F24S 70/16; F24S 10/30; F24S 50/80; F24S 70/14; F24S 70/20
See application file for complete search history.

(56) References Cited

U.S. PATENT DOCUMENTS 2,004,391 A * 6/1935 Price .......................... F28F 9/26 126/109
3,908,632 A * 9/1975 Poulsen .................. F24S 80/20 34/589
(Continued)

FOREIGN PATENT DOCUMENTS

CN 103288158 A * 9/2013 .............. F24S 23/71
CN 113097586 A * 7/2021 ........... H02N 11/002
JP S611953 A * 1/1986 ........... A01G 9/1469

*Primary Examiner* — Michael G Hoang
*Assistant Examiner* — Logan P Jones
(74) *Attorney, Agent, or Firm* — BACON&THOMAS.PLLC

(57) ABSTRACT

A heat collection and release system for a solar greenhouse is disclosed and includes a heat collection and release channel for circulating a first medium, arranged on a wall and/or a roof of the solar greenhouse, and located in the solar greenhouse, the wall and/or the roof, the wall and the roof of the solar greenhouse are made of a transparent material and are internally provided with a vacuum layer for preventing heat in the channel from being radiated to the outside of the solar greenhouse; a heat storage tank for storing a second medium; a heat exchange device, through
(Continued)

which the first medium and the second medium exchanging heat; and a fan for providing power for circulation of the first medium. A method includes, heat is stored in the second medium through heat exchange between the first medium and the second medium and is dissipated into the greenhouse through heat exchange between the first medium and the second medium.

15 Claims, 2 Drawing Sheets

(51) Int. Cl.

| | |
|---|---|
| ***F24S 10/40*** | (2018.01) |
| ***F24S 50/80*** | (2018.01) |
| ***F24S 60/00*** | (2018.01) |
| ***F24S 70/14*** | (2018.01) |
| ***F24S 70/20*** | (2018.01) |
| ***F24S 90/00*** | (2018.01) |
| *A01G 9/24* | (2006.01) |

(56) References Cited

U.S. PATENT DOCUMENTS

| | | | | |
|---|---|---|---|---|
| 4,020,989 | A * | 5/1977 | Kautz .................... | A01G 9/243 126/621 |
| 4,083,490 | A * | 4/1978 | Cunningham .......... | F24S 60/30 165/104.31 |
| 4,147,002 | A * | 4/1979 | Kautz ...................... | A01G 9/22 359/227 |
| 4,291,674 | A * | 9/1981 | Comte .................... | F24S 50/80 47/17 |
| 2012/0291769 | A1 * | 11/2012 | Fleszar .................. | F24S 80/54 126/623 |

* cited by examiner

HEAT COLLECTION AND RELEASE SYSTEM AND METHOD FOR SOLAR GREENHOUSE

CROSS-REFERENCE TO RELATED APPLICATION

This application is a national stage application of International Patent Application No. PCT/CN2023/099639, filed on Jun. 12, 2023, which claims priority of the Chinese Patent Application No. 202310653164.3, filed on Jun. 5, 2023, both of which are incorporated by references in their entities.

TECHNICAL FIELD

The present disclosure relates to the technical field of heat collection and release, in particular to a heat collection and release system and method for a solar greenhouse.

BACKGROUND

At present, the solar greenhouse in China has been developed in a relatively mature stage, but there are still some problems that cannot be ignored Firstly, the production of the solar greenhouse is greatly affected by severe weather such as snowstorm and low temperature. The solar greenhouse is low in resistance to low temperature and cold damage, resulting in unstable production. Secondly, most of the solar greenhouse environment is imperfect in automatic control. Devices, such as ventilation, irrigation, warming, dehumidification, and cooling, are generally manually operated. The overall environmental control ability is poor. Low temperature and high humidity at night seriously affect the yield and quality of vegetables. Furthermore, the land utilization rate of the solar greenhouse is still low. In order to increase the temperature of the solar greenhouse at night in many areas (such as Shandong and Ningxia), the heat storage capacity of the wall is increased by blindly increasing the thickness of the back wall (the thickest part is 6-8 m). However, the existing research shows that the effective heat storage layer of the back wall of the solar greenhouse is 20-40 cm in thickness, resulting in limited warming effect after the thickness of the back wall is blindly increased and serious waste of land resources.

At present, the most advanced research on improving the heat storage capacity of the solar greenhouse is usually to improve the wall heat storage and release performance of the solar greenhouse. In this way, by increasing the passive heat storage performance of cavities of the solar greenhouse, the wall of the solar greenhouse wall stores heat in the daytime and releases heat at night, so that the performance of the solar greenhouse against low temperature at night is improved. The passive heat storage and release method has limited improvement on the heat storage and release capacity of the solar greenhouse. Therefore, it is still difficult to avoid the phenomenon of low-temperature chilling damage in the solar greenhouse at night.

In most of the existing active heat storage and release methods, the solar water heater is directly used to warm the greenhouse at night. The method is difficult to fully adapt to the specific environment of the solar greenhouse, and is high in cost and difficult to popularize.

SUMMARY

The present disclosure aims to provide a heat collection and release system and method for a solar greenhouse so as to solve the problems in the prior art and improve the heat collection and release performance of the solar greenhouse.

In order to achieve the purpose, the present disclosure provides the following scheme.

The present disclosure provides a heat collection and release system for a solar greenhouse, including:

- a heat collection and release channel for circulating a first medium, arranged on a wall and/or a roof of the solar greenhouse, and located in the solar greenhouse, the wall and/or the roof; wherein, both the wall, provided with the heat collection and release channel, of the solar greenhouse and the roof, provided with the heat collection and release channel, of the solar greenhouse are made of a transparent material, and are internally provided with a vacuum layer; the vacuum layer is used for preventing heat in the heat collection and release channel from being radiated to an outside of the solar greenhouse;
- a heat storage tank for storing a second medium;
- a heat exchange device, wherein the first medium and the second medium exchange heat through the heat exchange device; and
- a fan for providing power for circulating flow of the first medium.

In some embodiments, the first medium is energy storage particles, and surfaces of the energy storage particles each are coated with a solar energy absorption coating; the solar energy absorption coating is made of $TiO_2$, $CuFeMnO_4$ and $CoCl_2 \cdot 3H_2O$ in a weight ratio of 1:8:5; and the second medium is water.

In some embodiments, the energy storage particles are made of polyethylene or ceramics; and particle sizes of the energy storage particles are in nanoscale.

In some embodiments, one end of the heat collection and release channel communicates with a feed end of the first channel of the heat exchange device, and the other end of the heat collection and release channel communicates with a discharge end of the first channel of the heat exchange device; a feed end of the second channel of the heat exchange device communicates with a discharge end of the heat storage tank, and a discharge end of the second channel of the heat exchange device communicates with a feed end of the heat storage tank.

In some embodiments, an adsorption device is further provided on a connecting pipeline between the feed end of the first channel and the heat collection and release channel; the adsorption device comprises a lithium iron phosphate anode, a graphite cathode and a control unit, the lithium iron phosphate anode and the graphite cathode are electrically connected with the control unit, and the control unit is electrically connected with a power supply; and the connecting pipeline is partially located between the lithium iron phosphate anode and the graphite cathode.

In some embodiments, the heat collection and release system also includes a solar radiation sensor in signal connection with the control unit.

In some embodiments, the heat exchange device is a U-shaped shell-and-tube heat exchanger.

In some embodiments, both the wall and the roof are made of glass.

The present disclosure also provides a heat collection and release method for a solar greenhouse implemented by using the heat collection and release system for a solar greenhouse.

When sunshine is strong in daytime and heat needs to be collected, driving the first medium by the fan to circularly flow in the heat collection and release channel and the heat exchange device, driving the second medium by a liquid pump to circularly flow in the heat storage tank and the heat exchange device, exchanging heat between the first medium with absorbed heat and the second medium in the heat exchange device, and storing the exchanged heat in the second medium.

When heat needs to be released at night, driving the first medium by the fan to circularly flow in the heat collection and release channel and the heat exchange device, and driving the second medium by a liquid pump to circularly flow in the heat storage tank and the heat exchange device, exchanging heat between the second medium with stored heat and the first medium, and releasing heat from the first medium absorbed heat into the solar greenhouse.

Compared with the prior art, the present disclosure has the following technical effects.

The present disclosure heat collection and release system and method for a solar greenhouse effectively improve heat collection and release performance of the sola greenhouse.

BRIEF DESCRIPTION OF THE DRAWINGS

To describe the technical scheme in the embodiments of the present disclosure or in the prior art more clearly, the following briefly introduces the attached figures required for describing the embodiments. Apparently, the attached figures in the following description show merely some embodiments of the present disclosure, and those skilled in the art may still derive other attached figures from these attached figures without creative efforts.

Reference signs: 1, heat collection and release channel; 2, energy storage particle; 3, heat exchange device; 4, fan; 5, adsorption device; 501, lithium iron phosphate anode; 502, graphite cathode; 503, control unit; 6, heat storage tank; 7, vacuum layer; and 8, liquid pump.

DETAILED DESCRIPTION OF THE EMBODIMENTS

The following clearly and completely describes the technical scheme in the present embodiments of the present disclosure with reference to the attached figures in the present embodiments of the present disclosure. Apparently, the described embodiments are merely a part rather than all of the present embodiments of the present disclosure. Based on the embodiment in the present disclosure, all other embodiments obtained by the ordinary technical staff in the art under the premise of without contributing creative labor belong to the scope protected by the present disclosure.

The present disclosure aims to provide a heat collection and release system and method for a solar greenhouse so as to solve the problems in the prior art and improve the heat collection and release performance of the sola greenhouse.

To make the foregoing objective, features and advantages of the present disclosure clearer and more comprehensible, the present disclosure is further described in detail below with reference to the attached figures and specific embodiments.

Embodiment I

Figure 1:
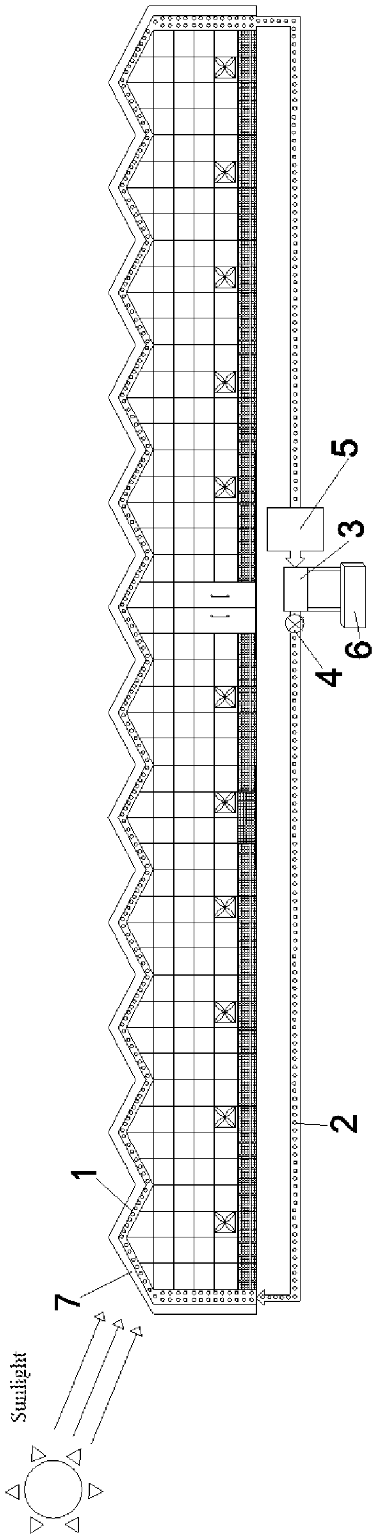
FIG. 1 is a structural schematic diagram of a heat collection and release system for a solar greenhouse in the present disclosure.
Figure 2:
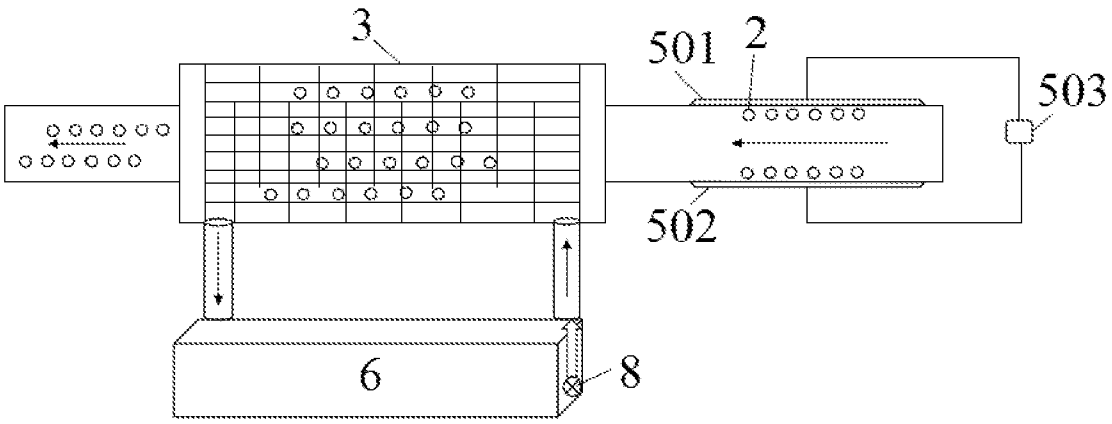
FIG. 2 is a partial structural schematic diagram of the heat collection and release system for a solar greenhouse in the present disclosure.

As shown in FIG. 1 and FIG. 2, the embodiment provides a heat collection and release system for a solar greenhouse. The heat collection and release system includes a heat collection and release channel 1, a heat storage tank 6, a heat exchange device 3, a fan 4, a liquid pump 8 and an adsorption device 5.

In the system, the heat collection and release channel 1 is arranged on a wall and a roof of the solar greenhouse. It should be noted that the heat collection and release channel 1 is a whole channel, one part of the channel is located on the wall and the other part thereof is located on the roof. The heat collection and release channel 1 can be specifically fixed on inner walls of the wall and the roof, or completely built in the wall and the roof. The heat collection and release channel 1 is used for circulating a first medium. The wall provided with the heat collection and release channel 1 and the roof provided with the heat collection and release channel 1 in the solar greenhouse are both made of a transparent material, and are both internally provided with a vacuum layer 7 for preventing heat in the heat collection and release channel 1 from being radiated to the outside of the solar greenhouse. In the embodiment, both the wall and the roof are made of glass.

In the embodiment, the first medium is energy storage particles 2, and surfaces of the energy storage particles 2 each are coated with a solar energy absorption coating. The solar energy absorption coating is made of $TiO_2$, $CuFeMnO_4$ and $CoCl_2{\cdot}3H_2O$ in a weight ratio of 1:8:5. The energy storage particles 2 are made of polyethylene or ceramics. The particle sizes of the energy storage particles 2 are in nanoscale. The solar energy absorption coating in the embodiment has higher solar radiation absorption rate and lower radiation emissivity, so that the heat collection efficiency can be significantly improved. Through experiments, it is found that the solar radiation absorption rate of the solar energy absorption coating with the ratio can reach 93.5% in the solar spectrum of 0.3-2.5 μm, and the radiation emissivity is as low as 7.6% in the infrared spectrum of 2.5-50 μm. Compared with the existing solar coating materials, the heat collection efficiency is improved by 10% to 12%.

The heat storage tank 6 is used for storing the second medium. In the embodiment, the second medium is water.

The first medium and the second medium exchange heat through the heat exchange device 3. Specifically, one end of the heat collection and release channel 1 communicates with a feed end of the first channel of the heat exchange device 3, and the other end of the heat collection and release channel 1 communicates with a discharge end of the first channel of the heat exchange device 3. A feed end of the second channel of the heat exchange device 3 communicates with a discharge end of the heat storage tank 6, and a discharge end of the second channel of the heat exchange device 3 communicates with a feed end of the heat storage tank 6. A liquid pump 8 is also arranged at the discharge end of the heat storage tank 6. A liquid inlet of the liquid pump 8 communicates with the discharge end of the heat storage tank 6. A liquid outlet of the liquid pump 8 communicates with the feed end of the second channel. The liquid pump 8 is used for driving the second medium to circularly flow in the second channel of a heat image storage and heat rubber ring device. In the embodiment, the heat exchange device 3 is a U-shaped shell-and-tube heat exchanger.

The fan 4 is used for providing power for circulation of the first medium. In the embodiment, an air inlet of the fan 4 communicates with the discharge end of the first channel of the heat exchange device 3, and an air outlet of the fan 4 communicates with the heat collection and release channel 1.

An adsorption device 5 is also provided on a connecting pipeline between the feed end of the first channel and the heat collection and release channel 1. The adsorption device 5 includes a lithium iron phosphate anode 501, a graphite cathode 502 and a control unit 503, the lithium iron phosphate anode 501 and the graphite cathode 502 are electrically connected with the control unit 503, and the control unit 503 is electrically connected with a power supply. The connecting pipeline is partially located between the lithium iron phosphate anode 501 and the graphite cathode 502.

In the embodiment, a solar radiation sensor in signal connection with the control unit 503 is also included. The solar radiation sensor is used for obtaining the sunshine intensity. When the sunshine intensity is lower than a set value, the control unit 503 automatically turns on the adsorption device 5, so that the energy storage particles 2 are attracted by the graphite cathode 502. And then, the energy storage particles 2 are no longer distributed in the heat collection and release channel 1, the energy storage particles 2 are prevented from staying in the heat collection and release channel 1 and affecting the lighting of the solar greenhouse.

Embodiment II

The embodiment provides a heat collection and release method for a solar greenhouse implemented by using the heat collection and release system for a solar greenhouse in the first embodiment. The heat collection and release method is specifically as follows.

When the sunshine is strong in the daytime and heat needs to be collected, the fan 4 drives the first medium to circularly flow in the heat collection and release channel 1 and the heat exchange device 3, the liquid pump 8 drives the second medium to circularly flow in the heat storage tank 6 and the heat exchange device 3, the first medium absorbs heat and then exchanges heat with the second medium in the heat exchange device 3, and the heat is stored in the second medium.

When heat needs to be released at night, the fan 4 drives the first medium to circularly flow in the heat collection and release channel 1 and the heat exchange device 3, and the liquid pump 8 drives the second medium to circularly flow in the heat storage tank 6 and the heat exchange device 3, and the second medium stored with heat exchanges heat with the first medium, and the first medium absorbs heat and then releases heat into the solar greenhouse.

In the daytime, when the illumination intensity of sunlight is lower than 5500 Lux, the control unit 503 automatically turns on the adsorption device 5 for five minutes, so that the energy storage particles 2 are attracted by the graphite cathode 502, and then the fan 4 and the liquid pump 8 are turned off. Therefore, the energy storage particles 2 are no longer distributed in the heat collection and release channel 1, so that the energy storage particles 2 are prevented from staying in the heat collection and release channel 1 and influencing the lighting of the solar greenhouse.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A heat collection and release system for a solar greenhouse, comprising:

a heat collection and release channel for circulating a first medium, arranged on one or more of a wall and a roof of the solar greenhouse, and located in one or more of the solar greenhouse, the wall and the roof, wherein, the wall, provided with the heat collection and release channel, of the solar greenhouse is made of a transparent material, and is internally provided with a vacuum layer; and the roof, provided with the heat collection and release channel, of the solar greenhouse is made of a transparent material, and is internally provided with a vacuum layer; the vacuum layer is used for preventing heat in the heat collection and release channel from being radiated to an outside of the solar greenhouse;

a heat storage tank for storing a second medium;

a heat exchange device, wherein the first medium and the second medium exchange heat through the heat exchange device; and a fan for providing power for circulating flow of the first medium, wherein:

the first medium is energy storage particles, and surfaces of the energy storage particles each are coated with a solar energy absorption coating, the solar energy absorption coating is made of $TiO_2$, $CuFeMnO_4$ and $CoCl_2 \cdot 3H_2O$ in a weight ratio of 1:8:5, and the second medium is water.

2. The heat collection and release system for a solar greenhouse according to claim 1, wherein the energy storage particles are made of polyethylene or ceramics; and particle sizes of the energy storage particles are in nanoscale.

3. The heat collection and release system for a solar greenhouse according to claim 1, wherein one end of the heat collection and release channel communicates with a feed end of a first channel of the heat exchange device, and an other end of the heat collection and release channel communicates with a discharge end of the first channel of the heat exchange device; a feed end of a second channel of the heat exchange device communicates with a discharge end of the heat storage tank, and a discharge end of the second channel of the heat exchange device communicates with a feed end of the heat storage tank.

4. The heat collection and release system for a solar greenhouse according to claim 3, wherein an adsorption device is further provided on a connecting pipeline between the feed end of the first channel and the heat collection and release channel; the adsorption device comprises a lithium iron phosphate anode, a graphite cathode and a control unit, the lithium iron phosphate anode and the graphite cathode are electrically connected with the control unit, and the control unit is electrically connected with a power supply; and the connecting pipeline is partially located between the lithium iron phosphate anode and the graphite cathode.

5. The heat collection and release system for a solar greenhouse according to claim 4, further comprising a solar radiation sensor in signal connection with the control unit.

6. The heat collection and release system for a solar greenhouse according to claim 1, wherein the heat exchange device is a U-shaped shell-and-tube heat exchanger.

7. The heat collection and release system for a solar greenhouse according to claim 1, wherein both the wall and the roof are made of glass.

8. A heat collection and release method for a solar greenhouse implemented by using a heat collection and release system for a solar greenhouse, which comprises a heat collection and release channel for circulating a first medium, arranged on one or more of a wall and a roof of the solar greenhouse, and located in one or more of the solar greenhouse, the wall and the roof; wherein, the wall, provided with the heat collection and release channel, of the solar greenhouse is made of a transparent material, and is internally provided with a vacuum layer; and the roof, provided with the heat collection and release channel, of the solar greenhouse is made of a transparent material, and is internally provided with a vacuum layer; the vacuum layer is used for preventing heat in the heat collection and release channel from being radiated to an outside of the solar greenhouse;

a heat storage tank for storing a second medium;

a heat exchange device, wherein the first medium and the second medium exchange heat through the heat exchange device; and a fan for providing power for circulating flow of the first medium, the method comprising:

when sunshine is strong in daytime and heat needs to be collected, driving the first medium by the fan to circularly flow in the heat collection and release channel and the heat exchange device, driving the second medium by a liquid pump to circularly flow in the heat storage tank and the heat exchange device, exchanging heat between the first medium with absorbed heat and the second medium in the heat exchange device, and storing the exchanged heat in the second medium; and when heat needs to be released at night, driving the first medium by the fan to circularly flow in the heat collection and release channel and the heat exchange device, and driving the second medium by a liquid pump to circularly flow in the heat storage tank and the heat exchange device, exchanging heat between the second medium with stored heat and the first medium, and releasing heat from the first medium absorbed heat into the solar greenhouse.

9. The heat collection and release method for a solar greenhouse according to claim 8, wherein the first medium is energy storage particles, and surfaces of the energy storage particles each are coated with a solar energy absorption coating; the solar energy absorption coating is made of TiO2, CuFeMnO4 and CoCl2·3H2O in a weight ratio of 1:8:5; and the second medium is water.

10. The heat collection and release method for a solar greenhouse according to claim 9, wherein the energy storage particles are made of polyethylene or ceramics; and particle sizes of the energy storage particles are in nanoscale.

11. The heat collection and release method for a solar greenhouse according to claim 8, wherein one end of the heat collection and release channel communicates with a feed end of a first channel of the heat exchange device, and an other end of the heat collection and release channel communicates with a discharge end of the first channel of the heat exchange device; a feed end of a second channel of the heat exchange device communicates with a discharge end of the heat storage tank, and a discharge end of the second channel of the heat exchange device communicates with a feed end of the heat storage tank.

12. The heat collection and release method for a solar greenhouse according to claim 11, wherein an adsorption device is further provided on a connecting pipeline between the feed end of the first channel and the heat collection and release channel; the adsorption device comprises a lithium iron phosphate anode, a graphite cathode and a control unit, the lithium iron phosphate anode and the graphite cathode are electrically connected with the control unit, and the control unit is electrically connected with a power supply; and the connecting pipeline is partially located between the lithium iron phosphate anode and the graphite cathode.

13. The heat collection and release method for a solar greenhouse according to claim 12, further comprising a solar radiation sensor in signal connection with the control unit.

14. The heat collection and release method for a solar greenhouse according to claim 8, wherein the heat exchange device is a U-shaped shell-and-tube heat exchanger.

15. The heat collection and release method for a solar greenhouse according to claim 8, wherein both the wall and the roof are made of glass.

* * * * *